United States Patent [19]

Dietrich

[11] 4,102,146
[45] Jul. 25, 1978

[54] METHOD OF AND APPARATUS FOR HANDLING HOSE UNDERWATER

[75] Inventor: David S. Dietrich, Magnolia, Tex.

[73] Assignee: Sofec, Inc., Houston, Tex.

[21] Appl. No.: 800,313

[22] Filed: May 25, 1977

[51] Int. Cl.$^2$ .............................. F16L 1/00; B23Q 3/00
[52] U.S. Cl. ...................................... 61/110; 166/0.6; 285/18
[58] Field of Search .................. 61/110, 111, 107; 285/18, 24; 166/0.6, 0.5; 29/237

[56] References Cited

U.S. PATENT DOCUMENTS

| | | | |
|---|---|---|---|
| 3,592,014 | 7/1971 | Brown | 61/110 |
| 3,724,061 | 4/1973 | Schipper | 61/110 |
| 3,921,684 | 11/1975 | Allen | 285/24 |
| 3,968,838 | 7/1976 | Baugh | 166/0.6 |

*Primary Examiner*—Jacob Shapiro
*Attorney, Agent, or Firm*—Vinson & Elkins

[57] ABSTRACT

An apparatus for handling hose underwater and specifically for hose connection to an underwater pipe including a saddle adapted to receive a hose, a clamp for retaining the hose in the saddle, said saddle being movable, means for pulling a hose underwater into said saddle, and means for pulling the hose, after it has been brought into alignment with the underwater pipe, into sufficiently close proximity to the end of the underwater pipe for completing the connection. The method of making an underwater hose connection including the steps of pulling a hose down in the water, orienting a saddle to a position in which its axis is parallel to the axis of the hose, pulling the hose into the saddle, clamping the hose in the saddle, orienting the saddle to position the hose in axial alignment with the pipe to which the hose is to be connected and moving the hose into sufficiently close proximity for its connection to the underwater pipe.

11 Claims, 12 Drawing Figures

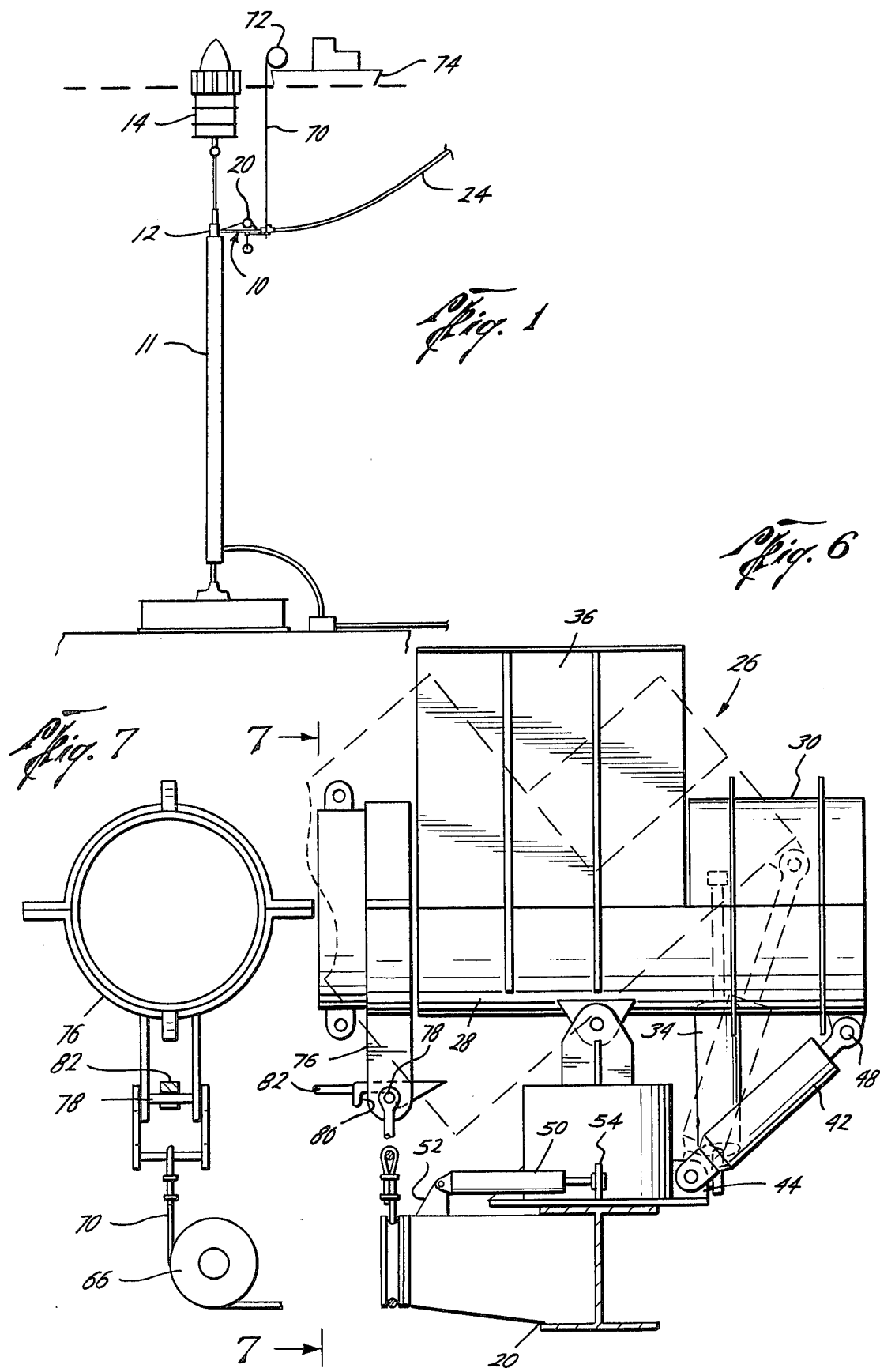

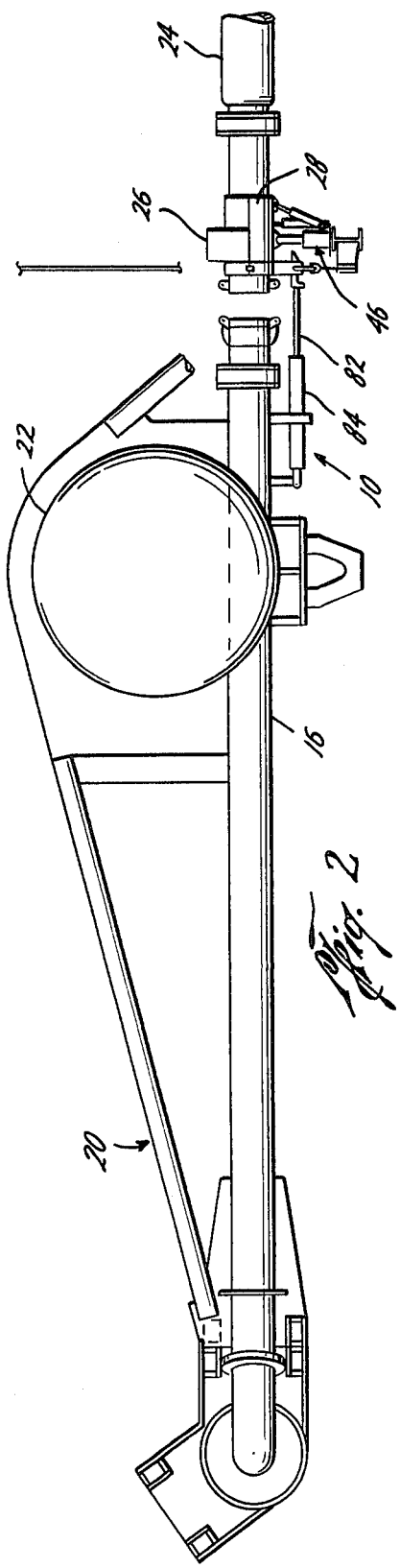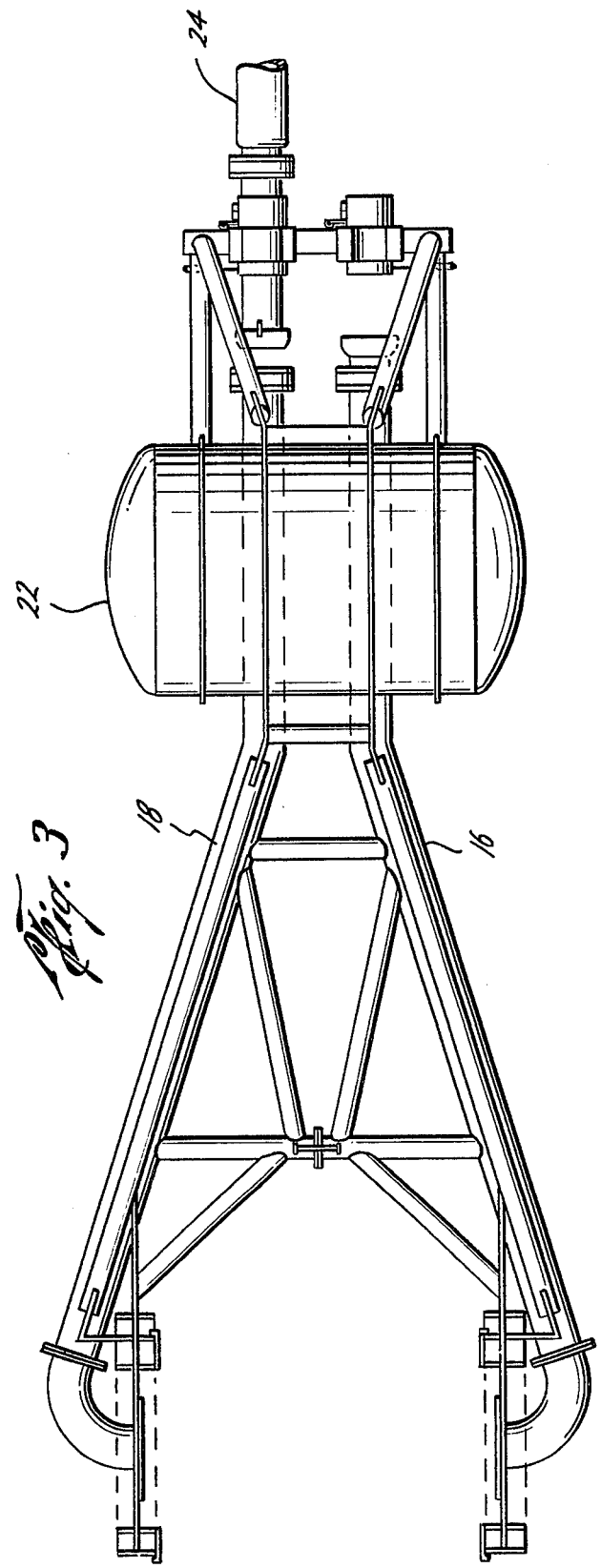

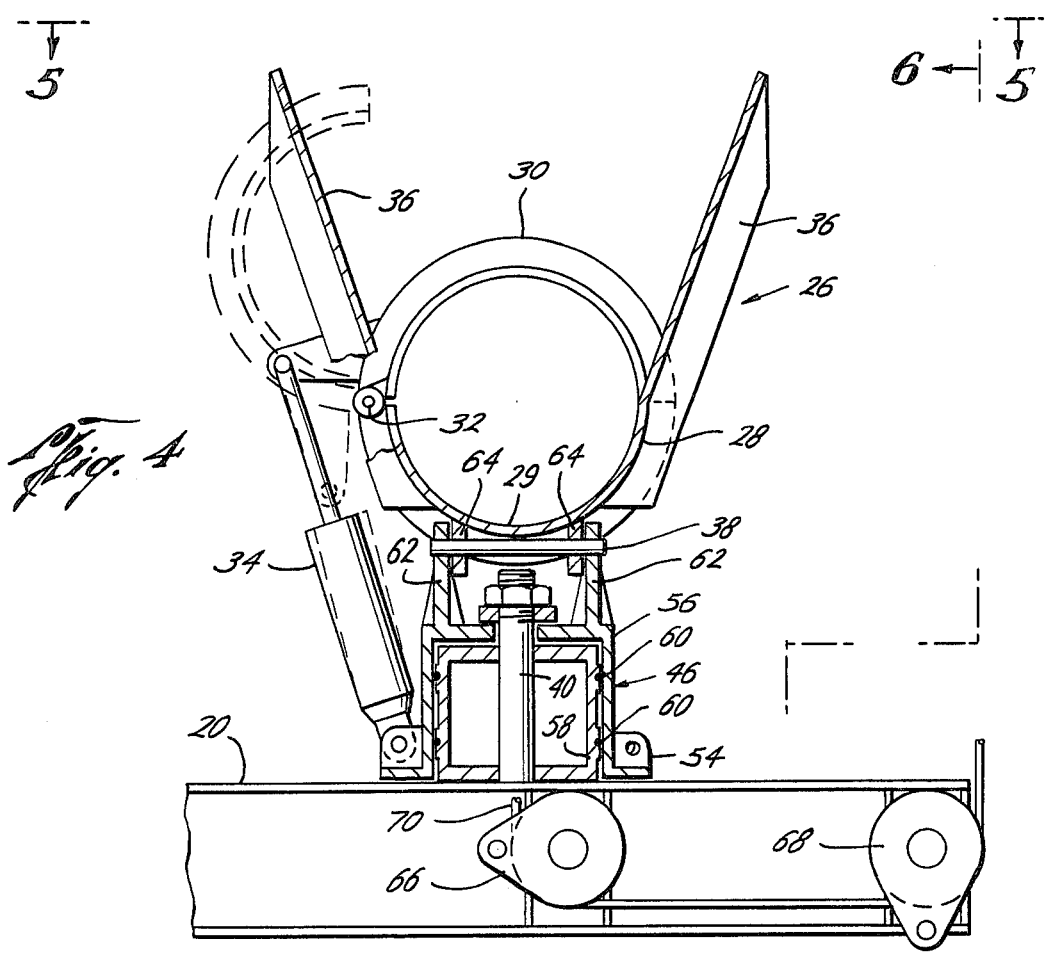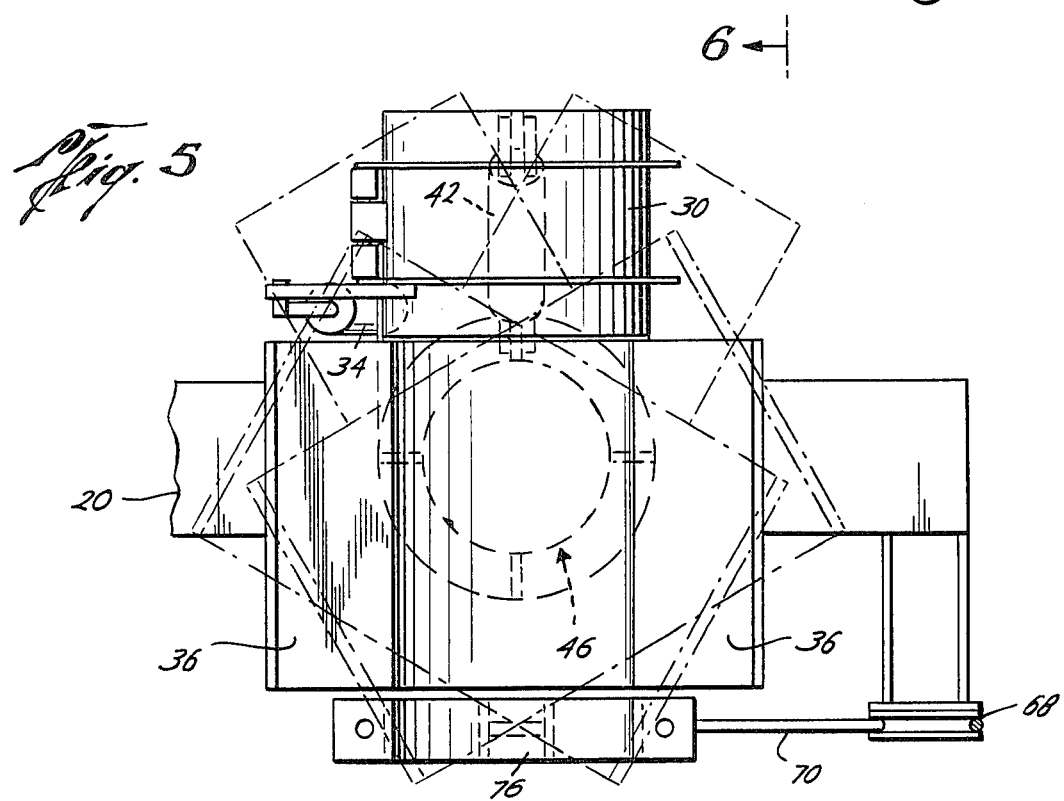

METHOD OF AND APPARATUS FOR HANDLING HOSE UNDERWATER

BACKGROUND OF THE INVENTION

The transfer of fluids to and from floating vessels has become more important in recent years, particularly with respect to the increased use of large tankers and super tankers. The use of the single anchor leg mooring system allows the provision for hawser connections to the buoy to control the vessel movement and in improved structures provides an underwater pipe connection for the vessel so that such connection and the hose swivel are not subjected to the wave action. The connection of floating hoses to such underwater mooring system pipes has required heavy equipment at the point of mooring to overcome the wave action and to bring the hose into sufficiently close proximity that a diver can manually make the connection.

It has been known in the past to provide a pivotally mounted cross-head which is adapted to place a clamping mechanism in proper position about the flanges of the conduit for coupling to a floating conduit as shown in the C. Van der Gaag U.S. Pat. No. 3,910,609. Also, the D. A. Shipper U.S. Pat. No. 3,724,061 discloses guides for the lowering of a hose connection downwardly in the water to connect with an underwater pipe. This structure provides suitable guides and brackets to bring the hose and pipe into alignment for the connection to be made.

The B. J. Watkins et al U.S. Pat. No. 3,260,270 discloses a method of remotely connecting flow lines to an underwater well head in which flexible lines are connected over a guide to pull the conduit into tight engagement with its connection and having suitable guiding structures to properly space the conduit for direct connection.

SUMMARY

The present invention relates to an improved method of an apparatus for handling buoyant hose under water and for making underwater hose connections. The improved apparatus includes a saddle defining a pipe receiving area which saddle is mounted in a position near the underwater pipe to which a hose is to be connected, the means for lowering a hose into the water in close proximity to the saddle, the means cooperating with the saddle for clamping the hose in the hose receiving portion of the saddle, the means for moving the saddle to bring it into alignment with the hose as the hose is being lowered in the water and further the means for moving the hose into sufficient close proximity with the underwater pipe for the connection to be made readily.

An object of the present invention is to provide an improved method and apparatus which allows underwater hose connections to be made with the assistance of a small work boat or barge on the surface and a diver positioned at the location of the underwater pipe to which the hose connection is to be made.

A further object of the present invention is to provide an improved apparatus for making an underwater hose connection in which the manual labor to be handled by a diver is minimized.

Another object of the present invention is to provide an improved method and apparatus of making an underwater hose connection which is operable in substantially rougher seas than any of the other prior art devices.

A still further object of the present invention is to provide an improved method and apparatus of making underwater hose connection which allows such connection to be made simply and quickly.

BRIEF DESCRIPTION OF THE DRAWINGS

These and other objects and advantages of the present invention are hereinafter set forth and explained with reference to the drawings wherein:

FIG. 1 is a schematic elevation view of a single point mooring system having the improved apparatus of the present invention included therein for connecting a hose to an underwater pipe.

FIG. 2 is an elevation view of the hose arm, floation tank and improved apparatus for making underwater hose connection of the present invention.

FIG. 3 is a plan view of the apparatus illustrated in FIG. 2.

FIG. 4 is an end elevation view of the improved apparatus taken from the front end of the hose receiving saddle.

FIG. 5 is a plan view of the apparatus shown in FIG. 4 taken along lines 5—5 in FIG. 4 and illustrating, in dashed lines, the degree of movement of the hose receiving saddle to accommodate to the position of the hose being lowered therein.

FIG. 6 is an elevation view taken along lines 6—6 in FIG. 4 and illustrates in dashed lines the adjustment to the angular position of the hose receiving saddle.

FIG. 7 is an end view of the apparatus shown in FIG. 6 taken along lines 7—7 in FIG. 6 to illustrate the connection of the arm for moving the hose axially into engagement with the underwater pipe connection.

DESCRIPTION OF THE PREFERRED EMBODIMENT

Figure 8:
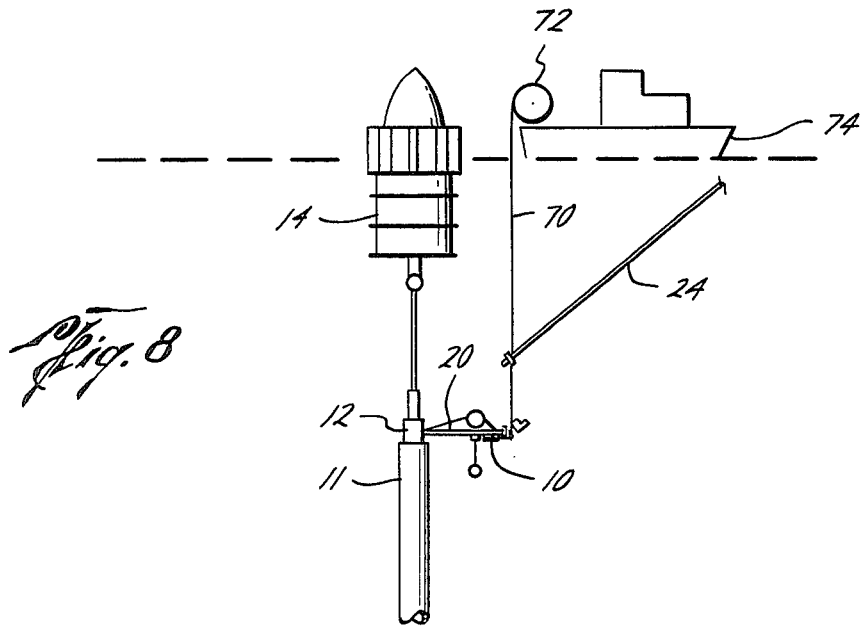
FIG. 8 is a schematic view illustrating the initial movement of the hose downwardly from the surface under control of the diver and responsive to the pull of the winch on the work boat.
Figure 9:
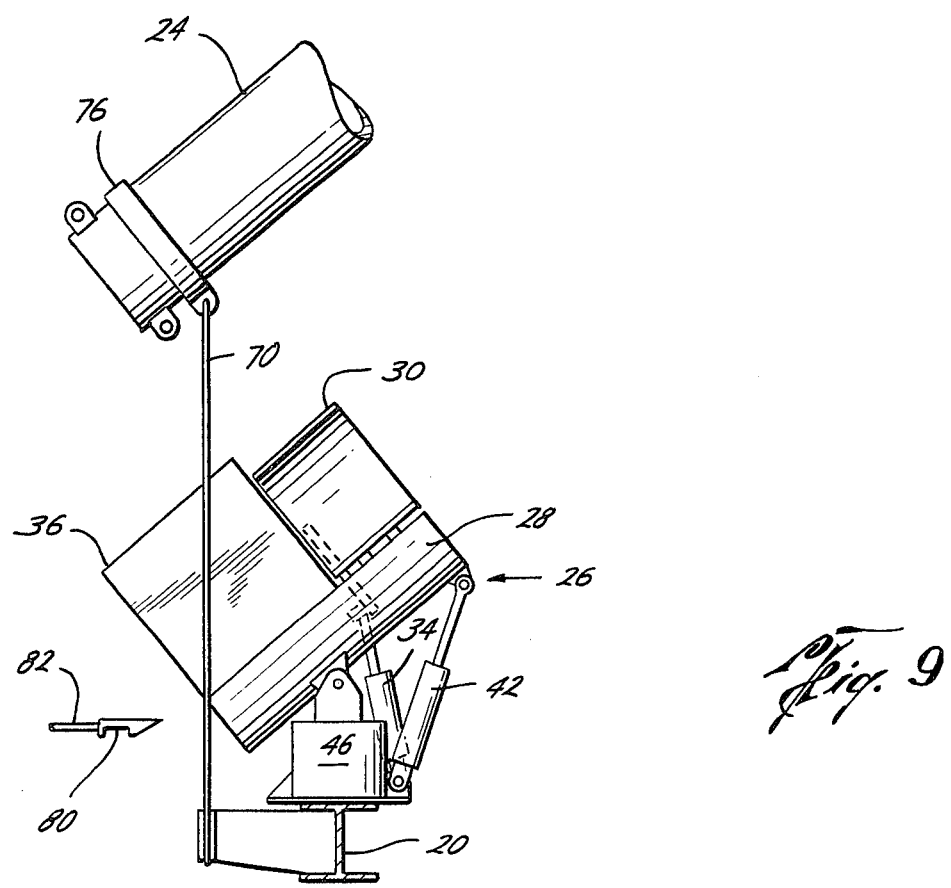
FIG. 9 is a detailed elevation view illustrating the accommodation of the angle of the hose receiving saddle to the angle of the hose as it is being pulled downwardly.
Figure 10:
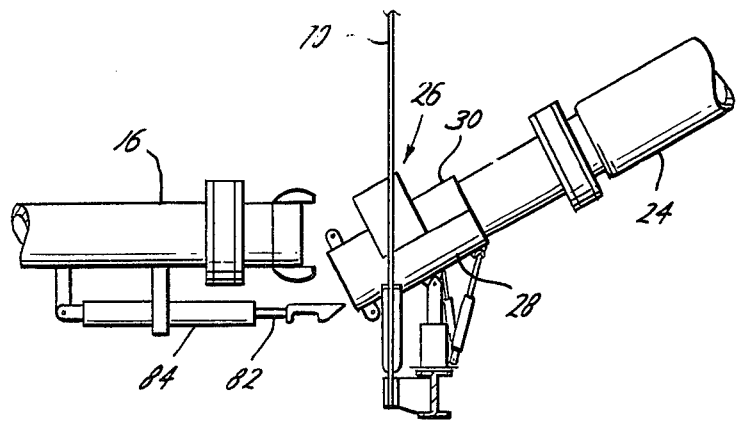
FIG. 10 is an elevation view illustrating the position of the apparatus after the hose has been clamped in the hose receiving saddle.

The underwater pipe 10 to which hoses are to be connected is secured to a riser shaft 11 or other underwater device providing suitable swivel assembly 12 all of which is supported by the mooring buoy 14. As can best be seen from FIGS. 2 and 3, the underwater pipe 10 in most instances is a dual pipe system including pipes 16 and 18 which are adapted to be connected into the opposite sides of the swivel assembly 12 and are supported by a structure 20 and the floation tank 22 all of which structure is more properly designated a hose arm. Since, as can be seen in FIG. 3, two of the underwater pipes 16 and 18 are provided the discussion with respect to one of such pipes is intended to apply to the other, it being understood that, as shown in FIG. 3, one of the underwater pipes is already connected to the hose 24 with the other of the pipes being available for connection to a second hose not shown in FIGS. 2 and 3.

The improved apparatus for assisting in the hose connection to the underwater pipe includes the saddle assembly 26. As best seen in FIGS. 4, 5, and 6, the saddle assembly 26 includes the saddle 28 which is semitubular in shape and provides the hose receiving portion 29 of the saddle assembly 26, the clamp 30 which is pivotally mounted to one side of the saddle 28 as at 32 and is controlled by the actuator 34, the sloping sides 36 which are upward diverging sides of the saddle 28 and the suitable mounting as hereinafter described. As can be seen, the sloping sides 36 allow the hose being pulled downwardly towards the saddle 28 to be guided therein even though it is not exactly centered over the saddle 28.

The saddle assembly mounting means includes the mounting pin 38 which allows the saddle to pivot about an axis which is transverse to the axis of the underwater pipe to which the hose is to be connected and the pin 40 which is also perpendicular to such axis and to the axis of pin 38. If pipe 16 is horizontal, the axis of the pin 40 would extend in a vertical direction. The actuator 42 which connects from the ear 44 on the rotary portion of the pivotal mounting 46 to the ear 48 on saddle 28 and provides for the angular displacement shown from the solid position in FIG. 6 to the dashed position in FIG. 6.

The actuator 50, which connects from the ear 52 on the structure 20 to the ear 54 on the pivotal mounting 46 for the saddle assembly, provides pivoting of the saddle assembly about the pin 40.

The mounting structure 46 for the saddle assembly 26 includes the cup-shaped member 56 which is pivotally mounted to the structure 20 and around the bearing mounting 58 with suitable bearings 60 positioned between the member 56 and mounting 58. The arms 62 extend upwardly from the member 56 and are engaged by the pin 38 which extends through the lugs 64 that are secured to the lower portion of the saddle 28 as best seen in FIG. 4. As can be seen from FIGS. 5 and 6, the improved saddle assembly 26 of the present invention allows a degree of rotation about the pin 40 of approximately 30° to either side, thus giving at least a 60° freedom of movement. As seen in FIG. 6, the saddle is pivoted about the pin 38 upwardly approximately 45°. This mutual pivoting of the saddle assembly 26 allows great freedom in matching the approximate position of the hose as it moves downwardly approaching the saddle assembly 26 and greatly simplifies its movement therein and its clamping by the clamp 30.

The apparatus for moving the hose downwardly involves the pulleys or sheaves 66 and 68 which are mounted to the structure 20. Cable 70 extending upwardly from the pulley 66 is approximately centered on the saddle assembly 26 and is positioned in front of the saddle assembly 26 in the direction toward the end of pipe 16 so that a hose being pulled downwardly thereby is brought into a position at which the saddle assembly 26 may be adjusted to properly receive the hose.

The cable or line 70 extends over the pulley 66 and the pulley 68 and upwardly to the winch 72 on board the work boat or small barge 74 as shown in FIG. 1. If desired, provision could be made to mount the winch 72 on the buoy 14 with suitable power source and controls to the underwater location. The cable 70 is connected to the end of the hose 24 by the band 76 as can best be seen in FIG. 6. The band 76 also provides the pin 78 which is engaged by the channel shaped recess 80 in the end of the arm 82 extending from the actuator 84 as best seen in FIGS. 6 and 7.

Figure 11:
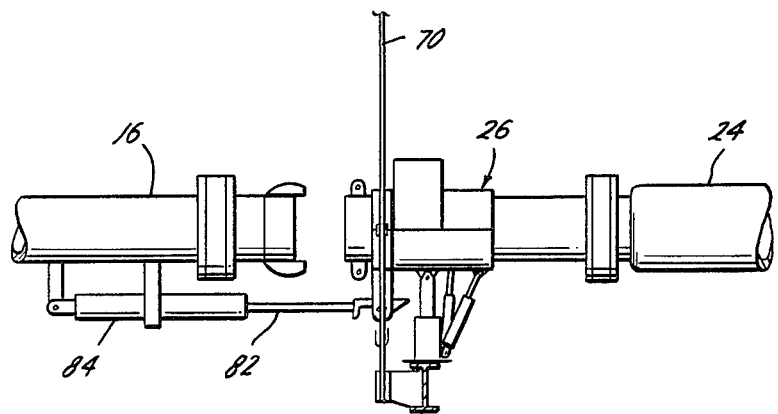
FIG. 11 is another elevation view illustrating the movement of the saddle to bring the hose into axial alignment with the pipe to which it is to be connected.
Figure 12:
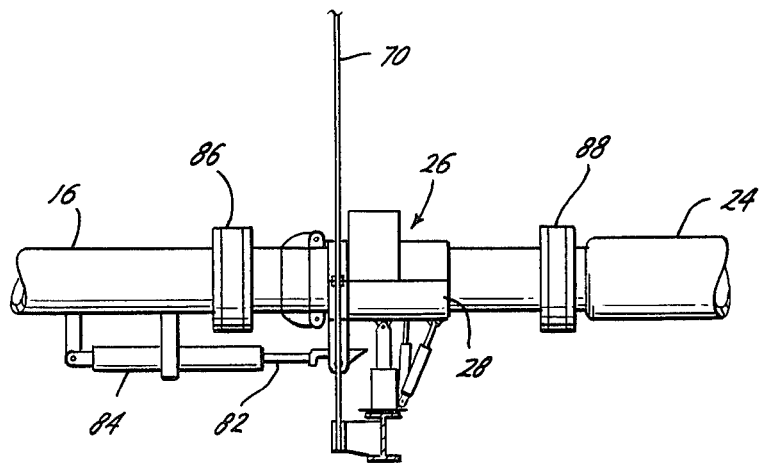
FIG. 12 is another elevation view illustrating the last position of the improved apparatus of the present invention which allows the diver to quickly make the connection between the hose and the underwater pipe.

The sequence of steps in connecting the hose to the underwater pipe are illustrated in FIGS. 8, 9, 10, 11 and 12. In FIG. 8, the work boat 74 is in position with the cable 70 extending from the winch 72 on the work boat 74 over the pulleys 66 and 68, and is suitably connected to the hose in the manner previously described. A diver is sent down from the work boat to the hose arm location. The controls for operation of the apparatus are positioned at such location. Pressure fluid for control operations can be supplied by the work boat 74 or by a reservoir on the buoy which may be charged from a work boat periodically as needed. The diver causes the winch 72 to be operated, moving the hose downwardly into a position approaching the saddle assembly 26. The diver actuates the actuator 34 to cause the clamp 30 to open and operates the actuator 42 and the actuator 50 to bring the saddle 28 into approximate parallel relationship with the hose 24 as hose 24 approaches the saddle. When the hose 24 has been pulled into this lowered position, actuator 34 closes clamp 30 upon the hose 24 whereby the hose is secured therein. Thereafter, the actuators 42 and 50 move the saddle assembly 26 to bring the hose 24 into alignment with the underwater pipe 16 which position is shown in FIG. 11. Thereafter, actuator 84 is extended to cause the recess 80 on the end of the actuator rod 82 to engage the pin 78 on the hose clamp 76. The hose 24 is pulled through the saddle assembly 26 into sufficiently close proximity with the end of the underwater pipe 16 to allow the diver to complete and seal the connection. Thereafter, the butterfly valve 86 in the pipe 16 and the butterfly valve 88 in the hose 24 can be opened to allow flow therethrough.

As used herein, the term "hose" is intended to include not only flexible hoses but also those steel tubings and other underwater flow lines which are to be connected to an underwater connection. Also, even though the drawings and description illustrate a single anchor leg mooring system, the present invention is applicable to other underwater connections in which one line is pulled into abutting relation to an underwater fitting for connection thereto.

Thus, the improved method and apparatus of the present invention allow a simple and quick connection of a buoyant hose to an underwater pipe with a minimum of manual labor by the diver and only a small surface boat or barge for assisting the operation. Also, the connection may be made in rougher seas than previously possible.

What is claimed is:

1. An apparatus for moving a hose into position for connection to an underwater pipe, comprising
   a saddle having a hose receiving portion positioned in an underwater location and near the end of said underwater pipe,
   means for pulling a hose down in the water,
   said pulling means being in a preselected position with respect to said saddle, and
   means for moving said saddle to bring said saddle in approximate parallel relation to said hose,
   said saddle moving means pivoting said saddle about a vertical axis and about a horizontal axis transverse to the axis of said underwater pipe and being positioned to move said hose into axial alignment with said underwater pipe.

2. An apparatus according to claim 1 including
means for moving the aligned hose into sufficiently close proximity for connection to said underwater pipe.

3. An apparatus according to claim 1 wherein, said pulling means includes,
a winch,
a line connected to said winch whereby said winch pulls on said line, and
means for exerting the pull on the line by the winch into a force for pulling a hose down into said saddle.

4. An apparatus according to claim 1 wherein, said pull exerting means includes
at least one sheave positioned below said saddle and between said saddle and the connecting end of the underwater pipe.

5. An apparatus according to claim 4 including,
means for supporting said winch at the surface of the water.

6. An apparatus according to claim 1 including,
control means for said saddle moving means and said pulling means.

7. An apparatus according to claim 6 wherein,
said control means are mounted in close relationship to said underwater pipe.

8. The method of handling a hose underwater including the steps of,
pulling a hose down in the water,
orienting a saddle having a hose receiving portion about a vertical axis and about a horizontal axis to bring said hose receiving portion into a position substantially parallel to said hose,
seating said hose in said saddle, and
orienting said saddle to position said hose in a preselect position.

9. The method according to claim 8 including the step of,
clamping said hose in the hose receiving portion of said saddle after said sealing step.

10. The method of moving a hose into position for connection to an underwater pipe including the steps of,
pulling a hose down in the water,
orienting a saddle having a hose receiving portion about a vertical axis and about a horizontal axis to bring said hose receiving portion into a position substantially parallel to said hose,
seating said hose in said saddle, and
orienting said saddle to position said hose in axial alignment with the underwater pipe, and
moving said hose sufficiently close to the end of said pipe for completing the connection of said hose to said pipe.

11. An apparatus for handling a hose underwater, comprising
a saddle positioned in an underwater location and having a hose receiving portion, a pivotal clamp and diverging sides to guide a hose into said hose receiving portion,
means for pulling a hose down in the water,
means for moving said saddle to bring said saddle into substantially parallel relation to said hose,
said pulling means being in a preselected position with respect to said saddle to position said hose in position for clamping in said saddle, and
control means for said saddle moving means and said pulling means mounted at said underwater location.

* * * * *